United States Patent
Wiersch et al.

(10) Patent No.: US 11,881,780 B2
(45) Date of Patent: *Jan. 23, 2024

(54) DYNAMIC BIASING CIRCUIT FOR MAIN COMPARATOR TO IMPROVE LOAD-TRANSIENT AND LINE-TRANSIENT PERFORMANCE OF BUCK CONVERTER IN 100% MODE

(71) Applicant: TEXAS INSTRUMENTS INCORPORATED, Dallas, TX (US)

(72) Inventors: Manuel Wiersch, Freising (DE); Gerhard Thiele, Dachau (DE); Antonio Priego, Freising (DE); Johann Erich Bayer, Thonhausen (DE)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/173,859

(22) Filed: Feb. 24, 2023

(65) Prior Publication Data

US 2023/0198402 A1    Jun. 22, 2023

Related U.S. Application Data

(62) Division of application No. 16/590,021, filed on Oct. 1, 2019, now Pat. No. 11,616,439.

(60) Provisional application No. 62/740,103, filed on Oct. 2, 2018.

(51) Int. Cl.
*H02M 3/158* (2006.01)
*H02M 1/00* (2006.01)

(52) U.S. Cl.
CPC .......... *H02M 3/158* (2013.01); *H02M 1/0032* (2021.05); *H02M 1/0048* (2021.05)

(58) Field of Classification Search
CPC ......... H02M 3/33538; H02M 3/33546; H02M 3/33515; H02M 3/33576; H02M 3/33553; H02M 3/33507; H02M 3/33592; H02M 3/33523; H02M 3/3353; H02M 3/33569; H02M 1/12; H02M 1/42; H02M 1/4225; H02M 1/4233; H02M 1/4241; H02M 1/4258; H02M 1/425; H02M 1/4208
See application file for complete search history.

(56) References Cited

U.S. PATENT DOCUMENTS

| | | | |
|---|---|---|---|
| 5,793,193 A * | 8/1998 | Hodgins | H02M 3/1588 323/284 |
| 2011/0025283 A1* | 2/2011 | Futamura | H02M 3/1588 323/282 |

* cited by examiner

*Primary Examiner* — Bryan R Perez
(74) *Attorney, Agent, or Firm* — Ray A. King; Frank D. Cimino

(57) ABSTRACT

An electrical system includes: 1) a buck converter; 2) a battery coupled to an input of the buck converter; and 3) a load coupled to an output of the buck converter. The buck converter includes a high-side switch, a low-side switch, and regulation loop circuitry coupled to the high-side switch and the low-side switch. The regulation loop circuitry includes: 1) a main comparator; 2) a bias current source coupled to the main comparator and configured to provide a bias current to the main comparator; and 3) a dynamic biasing circuit coupled to the main comparator and configured to add a supplemental bias current to the bias current in 100% mode of the buck converter. The supplemental bias current varies depending on an input voltage (VIN) and an output voltage (VOUT) of the buck converter.

16 Claims, 9 Drawing Sheets

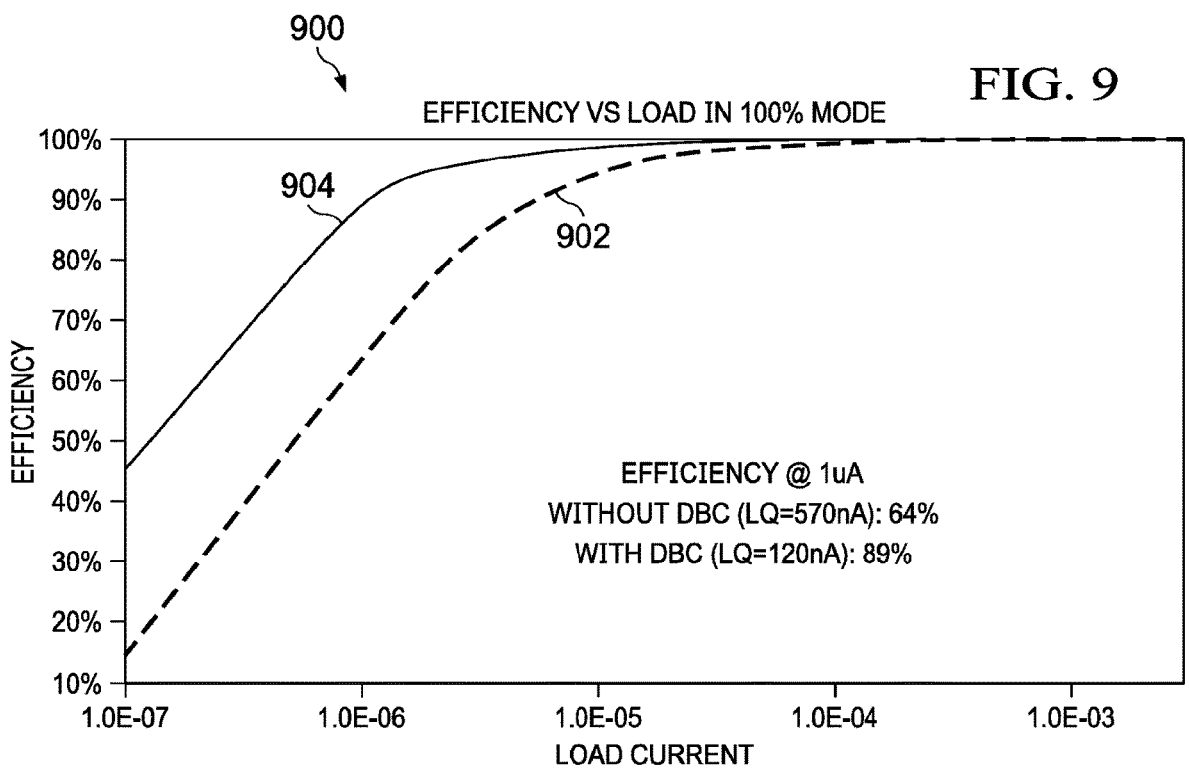

DYNAMIC BIASING CIRCUIT FOR MAIN COMPARATOR TO IMPROVE LOAD-TRANSIENT AND LINE-TRANSIENT PERFORMANCE OF BUCK CONVERTER IN 100% MODE

CROSS-REFERENCE TO RELATED APPLICATIONS

This application is a division of U.S. patent application Ser. No. 16/590,021 filed Oct. 1, 2019, which claims priority to U.S. Provisional Application No. 62/740,103, filed Oct. 2, 2018, both of which are hereby incorporated by reference.

BACKGROUND

Modern buck converters (see e.g., FIG. 1) can support duty-cycles up to 100%. A duty-cycle of 100% means that the converter is permanently in the on-phase in which the high-side power switch (M_HS) turns on for 100% of the time and the low-side power switch (M_LS) is off. This state is referred to as 100% mode. In the on-phase, all regulation loop components used to regulate the output voltage (VOUT) as well as supervisor circuits (e.g., to monitor current limits) and clocking circuits are usually active, resulting in a high quiescent current (Iq) in 100% mode.

To improve efficiency at light load in 100% mode, Iq needs to be reduced to an absolute minimum. One way to reduce Iq involves turning off unnecessary regulation loop components and reducing bias currents in the necessary regulation loop components used to regulate VOUT. However, a reduction in bias currents to regulation loop components in 100% mode can result in undesirably high propagation delay. With high propagation delay in the regulation loop, significant overshoot at VOUT can occur if the load is disconnected or the input voltage increases rapidly (line step).

SUMMARY

A first example includes a regulation loop circuit with a dynamic biasing circuit that is enabled in 100% mode. This dynamic biasing circuit provides a supplemental bias current ($I_{SUPP\_BIAS}$) that varies depending on the difference between VIN and VOUT. When the dynamic biasing circuit is enabled (e.g., in the 100% mode), $I_{SUPP\_BIAS}$ from the dynamic biasing circuit is added to a bias current ($I_{BIAS}$), resulting in a total bias current ($I_{TOT\_BIAS}$, where $I_{TOT\_BIAS}=I_{BIAS}+I_{SUPP\_BIAS}$) available for regulation loop components such as a main comparator. The addition of $I_{SUPP\_BIAS}$ to $I_{BIAS}$ decreases the propagation delay of the main comparator, which enables the regulation loop to avoid significant overshoot of VOUT when a transition from heavy load to light load or an input voltage step occurs in 100% mode.

BRIEF DESCRIPTION OF THE DRAWINGS

For a detailed description of various examples, reference will now be made to the accompanying drawings in which:

FIG. 9 is a graph illustrating 100% mode efficiency as a function of load current with and without the proposed dynamic biasing circuit.

DETAILED DESCRIPTION

Disclosed herein are buck converter topologies with regulation loop circuitry that includes a main comparator and a dynamic biasing circuit. The dynamic biasing circuit is enabled in 100% mode to add a supplemental bias current ($I_{SUPP\_BIAS}$) to a bias current ($I_{BIAS}$), where $I_{SUPP\_BIAS}$ varies depending on the difference between VIN and VOUT of the related buck converter. The total bias current ($I_{TOT\_BIAS}$, where $I_{TOT\_BIAS}=I_{BIAS}+$supplemental bias current) is provided to the main comparator. To provide a better understanding, an example buck converter topology with regulation loop circuitry that does not include a dynamic biasing circuit is described in FIG. 2. Meanwhile, FIGS. 3-6 are related to a buck converter topology with regulation loop circuitry that includes a dynamic biasing circuit in accordance with examples of the disclosure. Also, FIGS. 7A, 7B, 8A, 8B, and 9 are provided to show relevant performance results of a buck converter with and without the proposed dynamic biasing circuit In FIG. 2, a buck converter topology 200 with a buck core 202, an inductor (L), a DC resistance (DCR) of L, an output capacitor (COUT), and a load (RLOAD) is represented. As shown, the buck core 202 includes the power switches, M_HS and M_LS, as well as regulation loop circuitry such as a direct control and compensation block, an error amplifier (EA), a bias current ($I_{BIAS}$) source, a main comparator (main comp), control logic, and a gate driver. The inputs to main comp are based on a reference (REF) and VOUT. Also, the output of main comp is coupled to the control logic, and the output of the control logic is coupled to the input of the gate driver. In operation, the gate driver controls the on-state and off-state of the power switches, M_HS and M_LS, where the control logic controls the three possible states of the power switches. The first state is the on-phase in which M_HS is on and M_LS is off, the second state is the off-phase in which M_HS is off and M_LS is on, and the last state is the pause state in which both switches are off.

Figure 1:
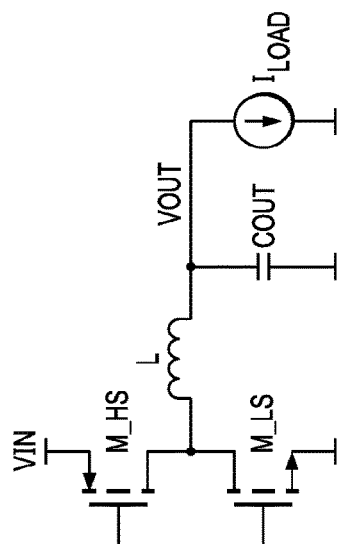
FIG. 1 is a schematic diagram showing a power stage of a buck converter.
Figure 2:
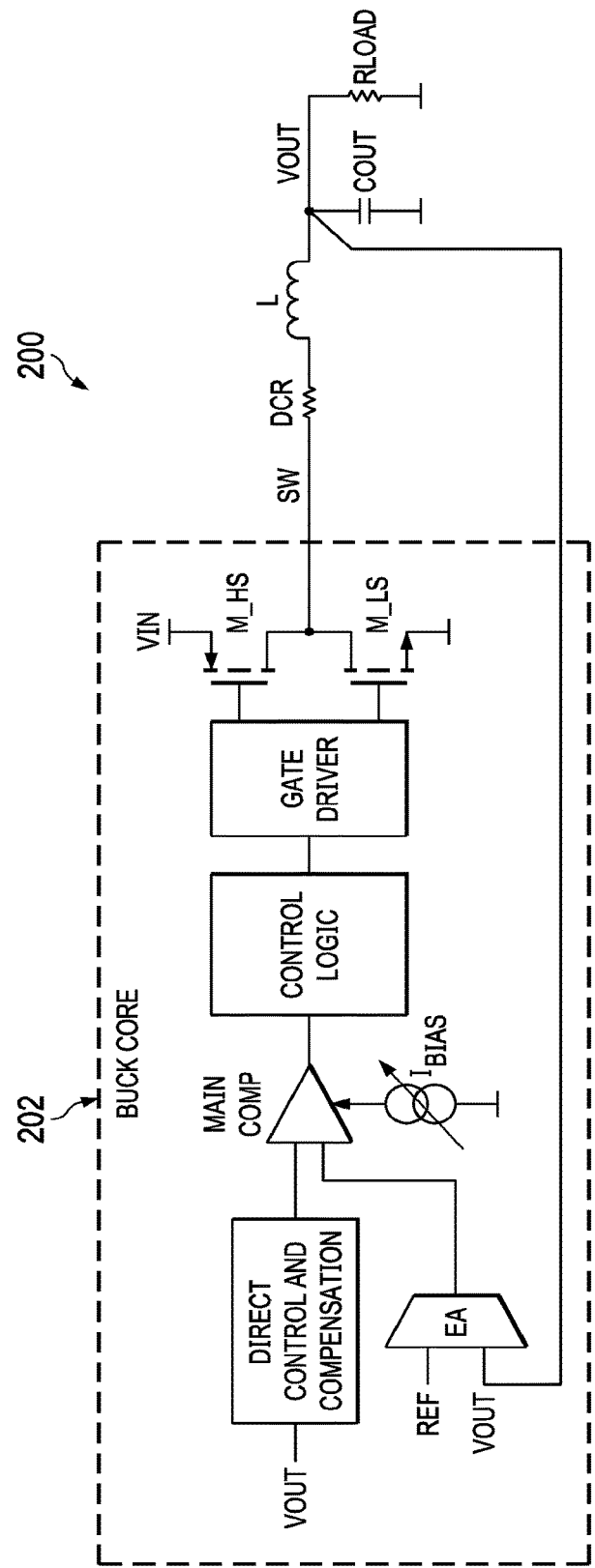
FIG. 2 is a schematic diagram showing a buck converter topology with regulation loop circuitry.

Main comp is used to detect if VOUT is below or above REF. Once VOUT drops below REF, a new switching cycle is initiated starting with the on-phase to bring up the output voltage VOUT. The state to bring up VOUT is called the active state. In this state, main comp is biased with a bias current, $I_{BIAS}$, in the microampere range to minimize its propagation delay and ensure the desired switching frequency. At light load, the buck converter of FIG. 2 enters the pause state after VOUT goes above the reference. In the pause state, main comp gets biased in the nanoampere range for minimum quiescent current and maximum efficiency. If the buck converter of FIG. 2 is operating with a duty-cycle below 100%, the period of the pause state can be used to detect a light load situation. As there is no such load indication in 100% mode, the comparator is either biased with a high current in this state or its bias current gets reduced after some time in 100% mode.

The quiescent current of a buck converter (e.g., the buck converter of FIG. 2) is the main contributor to the efficiency at light load. Therefore, in 100% mode only the circuitry needed to regulate VOUT is active (e.g., main comp). After a certain time in 100% mode, the bias current of main comp gets reduced to minimize the quiescent current of the buck converter and maximize the efficiency. However, if main comp is running with a bias current in the nanoampere region, its propagation delay is pretty high and can cause a significant overshoot at VOUT for fast rising input voltage steps (e.g., plug device into USB port). At heavy load, the buck converter of FIG. 2 can enter 100% mode even if VIN is higher than VOUT due to the voltage drop across the high-side switch and the DCR of the inductor. In this scenario, increased high propagation delay results in a significant overshoot at VOUT if the load is disconnected.

Figure 3A:
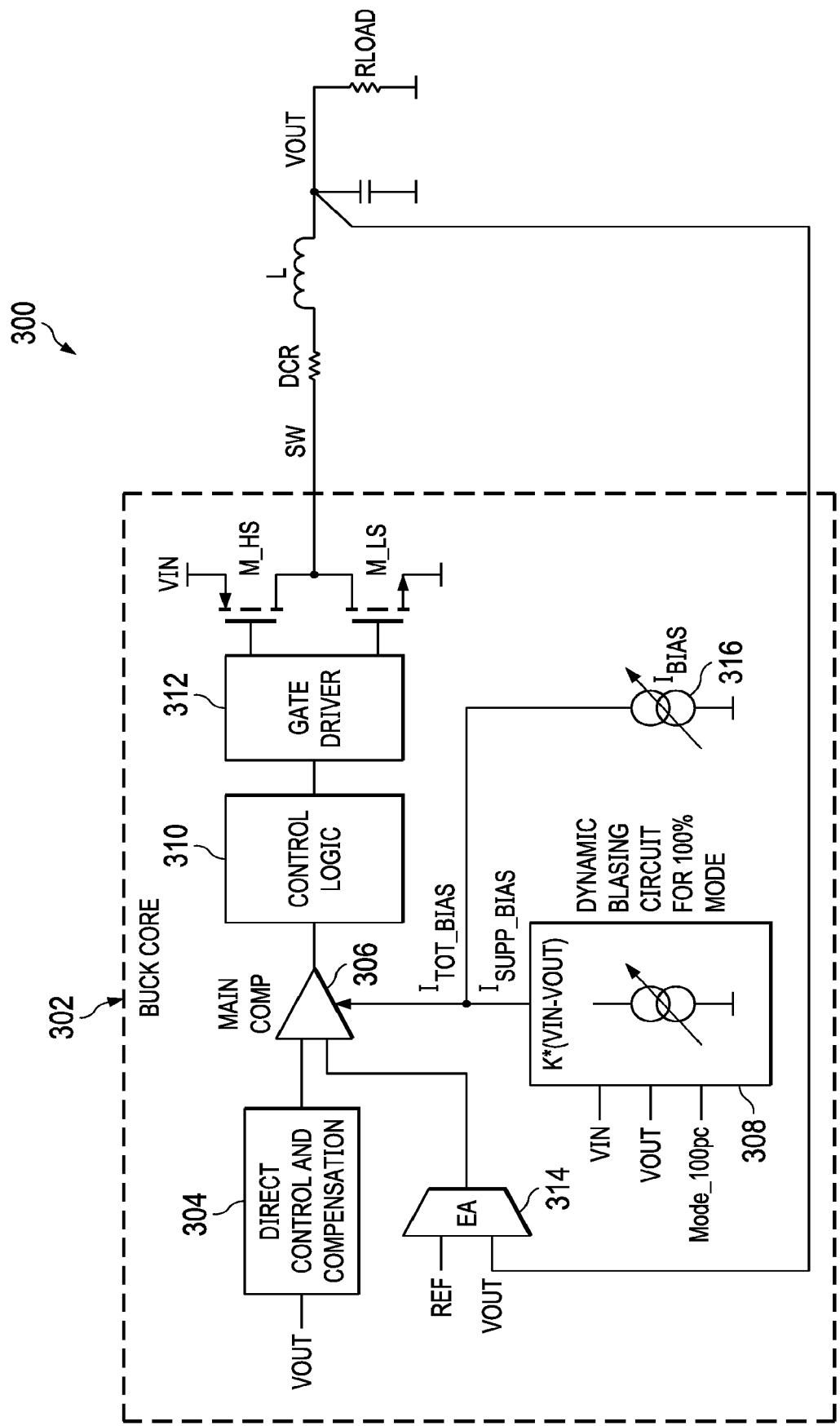
FIG. 3A is a schematic diagram showing a buck converter topology with regulation loop circuitry in accordance with examples of the disclosure.

FIG. 3A is a schematic diagram showing a buck converter topology 300 with components similar to the buck converter topology 200 of FIG. 2, except that the buck core 302 of the buck converter topology 300A includes a dynamic biasing circuit 308. More specifically, the buck core 302 includes a main comparator 306 configured to receive VOUT via direct control and compensation circuitry 304. The main comparator 306 also receives the output of an error amplifier 314. As shown, the inputs of the error amplifier 314 include a reference (REF) and VOUT. In some examples, a scaled (e.g., divided) version of VOUT is used for regulation operations. For example, the VOUT provided to the main comparator 306 The buck core 302 also includes M_HS and M_LS.

In operation, the dynamic biasing circuit 308 is enabled in 100% mode of the buck converter of FIG. 3A to add a supplemental bias current ($I_{SUPP\_BIAS}$) depending on the difference between VIN and VOUT. When the dynamic biasing circuit 308 is enabled (e.g., using the control signal "Mode_100pc" to indicate 100% mode), $I_{SUPP\_BIAS}$ from the dynamic biasing circuit 308 is added to $I_{BIAS}$ provided by the $I_{BIAS}$ source, resulting in $I_{TOT\_BIAS}=I_{BIAS}+I_{SUPP\_BIAS}$. As shown, $I_{TOT\_BIAS}$ is provided to the main comp of the buck core 302.

In the example of FIG. 3A, $I_{SUPP\_BIAS}$ is estimated as K*(VIN−VOUT), where K is a constant or function. If VIN and VOUT are equal, the dynamic biasing circuit 308 is configured to add a minimum supplemental bias current (e.g., $I_{SUPP\_BIAS}=I_{SUPP\_BIAS\_MIN}$) to $I_{BIAS}$ such that $I_{TOT\_BIAS}=I_{BIAS}+I_{SUPP\_BIAS\_MIN}$. The addition of $I_{SUPP\_BIAS\_MIN}$ (e.g., 2 nA) to $I_{BIAS}$ has almost no impact on the efficiency of the buck converter of FIG. 3A at light load in 100% mode. As the difference between VIN and VOUT increases, the value of $I_{SUPP\_BIAS}$ increases from $I_{SUPP\_BIAS\_MIN}$ up to a maximum supplemental bias current ($I_{SUPP\_BIAS}=I_{SUPP\_BIAS\_MAX}$). The addition of $I_{SUPP\_BIAS\_MAX}$ (e.g., 4.3 uA) or other intermediate $I_{SUPP\_BIAS}$ values to $I_{BIAS}$ results in $I_{TOT\_BIAS}=I_{BIAS}+I_{SUPP\_BIAS}$, which decreases the propagation delay of the main comparator (e.g., by a factor of 10) and thus enables the regulation loop to avoid significant overshoot of VOUT when a transition from heavy load to light load or a fast rising line step occurs in 100% mode.

Figure 3B:
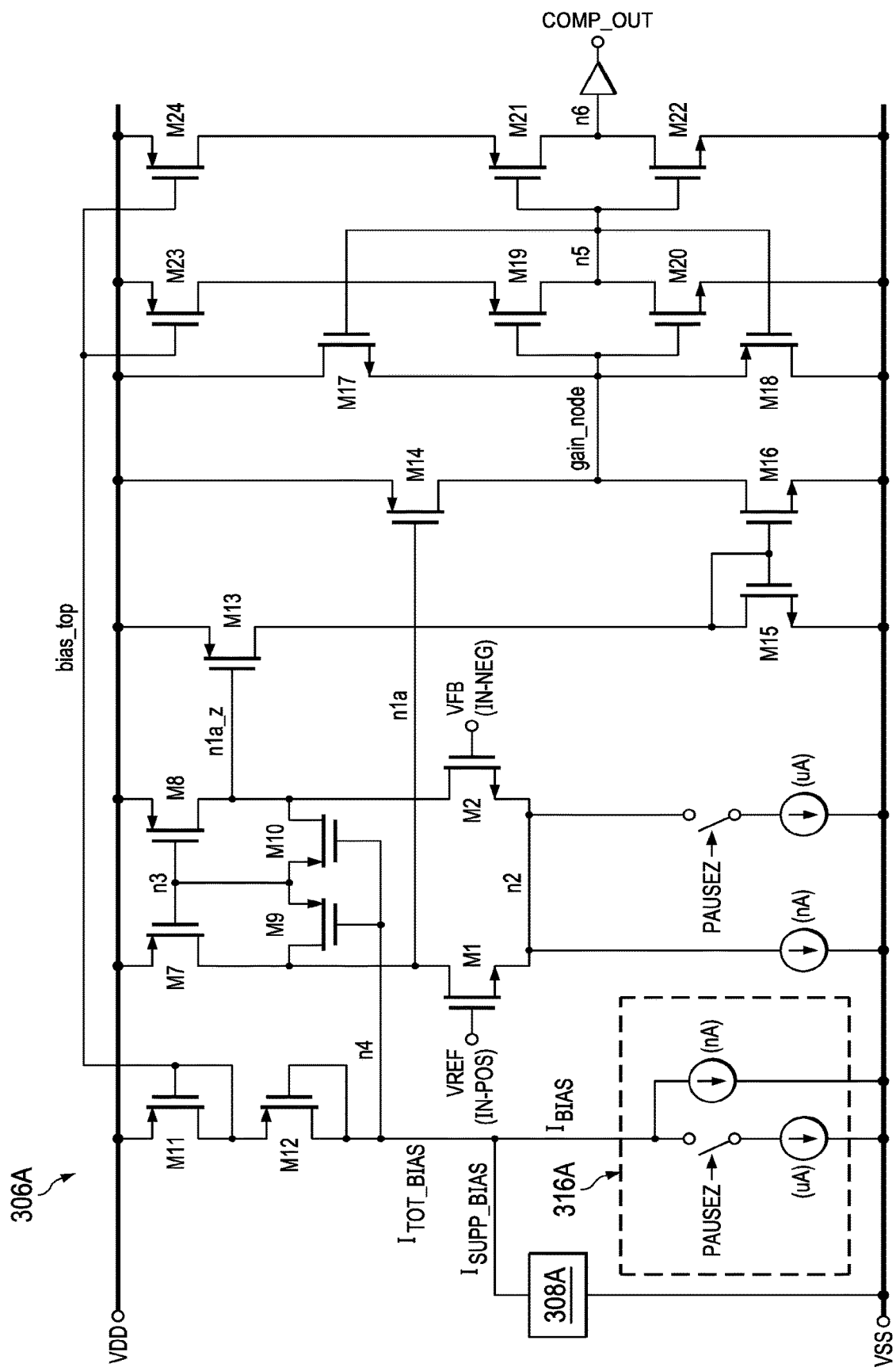
FIG. 3B is a schematic diagram showing a main comparator topology in accordance with examples of the disclosure.

FIG. 3B is a schematic of a main comparator 306A (an example of the main comparator 306 in FIG. 3A) in accordance with examples of the disclosure. In the example of FIG. 3B, the inputs of the main comparator 306A include a reference voltage (VREF) (e.g., the output of the error amplifier 314) and a feedback voltage (VFB) (e.g., VOUT or the output of the direct control and compensation circuit 304). The gate voltage, n4, for transistors M9 and M10 is generated in a bias branch coupled to a bias current source 316A (an example of the bias current source 316 in FIG. 3A) and to a dynamic biasing circuit 308A (an example of the dynamic biasing circuit 308 in FIG. 3A), where the bias branch provides $I_{TOT\_BIAS}$ as described herein. As shown, the bias branch is part of a current path with transistors M11 and M12. In the example of FIG. 3B, the bias current source 316A and the dynamic biasing circuit 308A are part of the main comparator 306A. In other examples, the bias current source 316A and the dynamic biasing circuit 308A are represented as external to main comparator 306A. In either case, by proper biasing of M9 and M10, these transistors operate in the "linear region" (the current of M9 is changing if its drain-source voltage changes) and can be considered as resistors with the value Ron.

The advantage of using M9 and M10 instead of resistors is that with proper biasing of M11 and M12 the preamplifier gain can be first order independent of the bias currents. That means that the preamplifier gain is similar if the main comparator 306A is running with bias currents in the uA-range or nA-range. The preamplifier gain (Ap) at nodes n1a and n1a_z is Ap=gm*Ron, where gm is the transconductance of the input pair (M9 and M10) and where Ron in the on resistance of the input pair. The transistors M13 and M14 are connected to the nodes n1a_z and n1a. If VFB is higher than VREF, then the voltage at n1a_z will drop and the current in M13 can increase significantly because it is not limited by any circuit. For a small voltage difference VFB>VREF at the inputs of the main comparator 306A, the current increase in M13 can be calculated as follows: $I_{DS}(M13)/I_0=\exp((VFB-VREF)/(n*26\ mV))$ with $I_0$ as the drain-source current in M13 if the overdrive is 0V.

In the main comparator 306A, the transistors M17 and M18 are used to clamp the voltage at gain_node to reduce the propagation delay. With this clamping structure, the current that is flowing through M13 is mirrored by transistor M15 and M16 with M17 providing the current for M16. If the main comparator 306A is biased in the nA-region then its propagation delay would increase by a factor of 4 to 10 without the clamping structure (M17 and M18). As described herein, the dynamic biasing circuit 308A increases $I_{TOT\_BIAS}$ as VIN-VOUT increases in 100% mode to reduce propagation delay of the main comparator 306A even if $I_{BIAS}$ from the bias current source 316A is in the nanoampere range.

At higher overdrive voltages there will be a significant voltage difference between the gate-source and drain-source voltages of M9 and M10. This will lead to different Ron values for M9 and M10 and therefore will increase the preamplifier gain in one branch and decrease it in the other branch—increasing the current in M13 or M14 even further (e.g. if the drain-source voltage of M9 or M10 reaches the region of the saturation voltage then its on resistance can increase by 10× or more). In addition to the increase in current consumption, the propagation delay increases due to the high voltage swing at n1a and n1a_z. Particularly, for bias currents in the nA-range it takes a long time until the nodes n1a and n1a_z recover from the overdrive state. Again, as described herein, the dynamic biasing circuit 308A increases $I_{TOT\_BIAS}$ as VIN-VOUT increases in 100% mode to reduce propagation delay of the main comparator 306A even if $I_{BIAS}$ from the bias current source 316A is in the nanoampere range.

Figure 4:
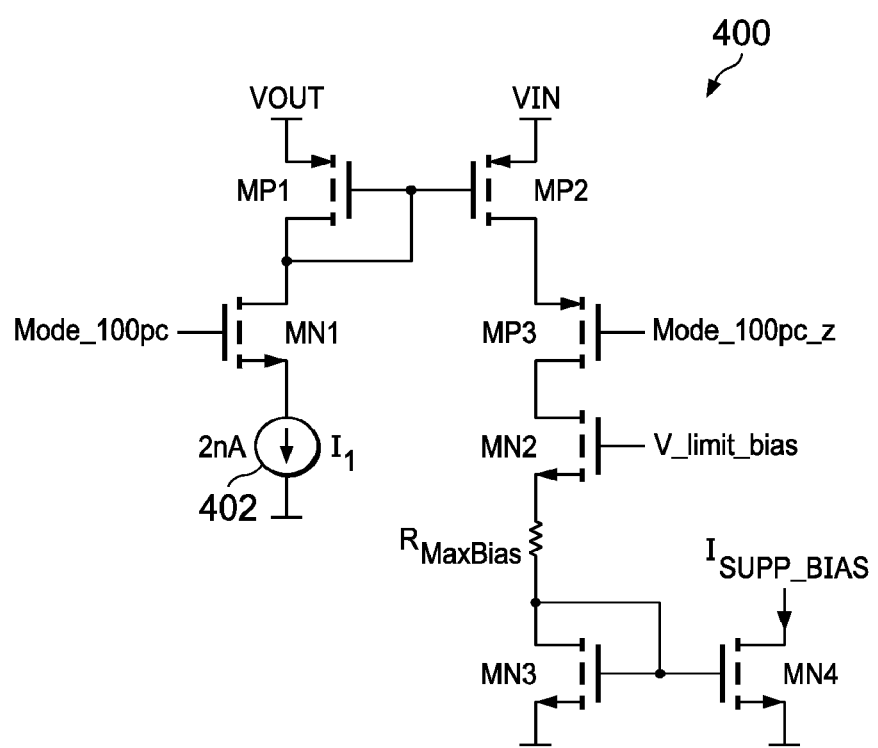
FIG. 4 is a schematic diagram showing a circuit implementation of a dynamic biasing circuit in accordance with examples of the disclosure.

FIG. 4 is a schematic diagram showing a circuit implementation of a dynamic biasing circuit 400 (an example of the dynamic biasing circuit 308 in FIG. 3A) in accordance with examples of the disclosure. As shown, the dynamic biasing circuit 400 has a first current mirror using transistors (e.g., diode-connected transistors), MP1 and MP2, where the source terminals of MP1 and MP2 are connected to different voltages, and where the gate terminal voltages are equal. More specifically, the source terminal of MP1 is coupled to VOUT and the source terminal of MP2 is coupled to VIN. Also, MP1 is biased with a minimum supplemental bias current, $I_1$, to provide the gate terminal voltage for MP2. In the example of FIG. 4, a current source 402 is configured to provide $I_1$ via a switch (MN1) controlled by a Mode_100pc signal, which indicates when the related buck converter is in 100% mode.

If VOUT and VIN are equal as well as the device types and sizes for MP1 and MP2, then the current through MP2 is equal to the current through MP1. Assuming that MP1 and MP2 are operating in weak inversion, then the drain current of MP2 at room temperature can be calculated using the following equation: $I_{SUPP\_BIAS}=I_1*\exp((VIN-VOUT)/(n*26\,mV))$, where n is the substrate factor and 26 mV is the thermal voltage. This equation is valid as long as MP2 is operating in weak inversion. Assuming n=1.5 and a difference between VIN and VOUT of 90 mV, then the drain current in MP2 is 10× higher than $I_{BIAS}$ in 100% mode as long as MP1 and MP2 are in weak inversion.

The drain current in MP2 is mirrored by a second current mirror formed by MN3 and MN4, where the drain terminal current of MN4 is $I_{SUPP\_BIAS}$. To avoid malfunction of main comp by a too high bias current, the maximum bias current is limited. Therefore, a voltage, V_limit_bias, is connected to the gate terminal of another transistor, MN2, between the first current mirror and the second current mirror, where the maximum bias current is adjusted using a resistor, $R_{MaxBias}$. As shown, the dynamic biasing circuit 400 also includes another transistor (MP3) coupled between the first current mirror and the second current mirror and controlled by a Mode_100pc_z signal, where Mode_100pc_z is the inverse of Mode_100pc. In FIG. 4, MP1-MP3 corresponds to P-type transistors and MN1-MN4 corresponds to N-type transistors.

In operation, the dynamic biasing circuit 400 is only enabled when the Mode_100pc indicates the related buck converter is in 100% mode. When enabled, the difference between VIN and VOUT determines the value of $I_{SUPP\_BIAS}$. If VIN=VOUT, $I_{SUPP\_BIAS}$ will be equal to the minimum supplemental bias current, $I_1$. As the difference between VIN and VOUT increases (VIN>VOUT), $I_{SUPP\_BIAS}$ will increase from the minimum supplemental bias current up to a maximum supplemental bias current determined by V_limit_bias and $R_{MaxBias}$. If MP2 enters moderate to strong inversion then the current dependency changes gradually from exponential to quadratic and is clamped by MN2 and $R_{MaxBias}$ (see e.g., FIG. 5). The clamping to a maximum supplement bias current guarantees that there are no malfunctions (e.g., high propagation delay or wrong decision due to out of saturation issues) in the main comparator due to the total bias current ($I_{TOT\_BIAS}=I_{BIAS}+I_{SUPP\_BIAS}$) being too high.

Figure 5:
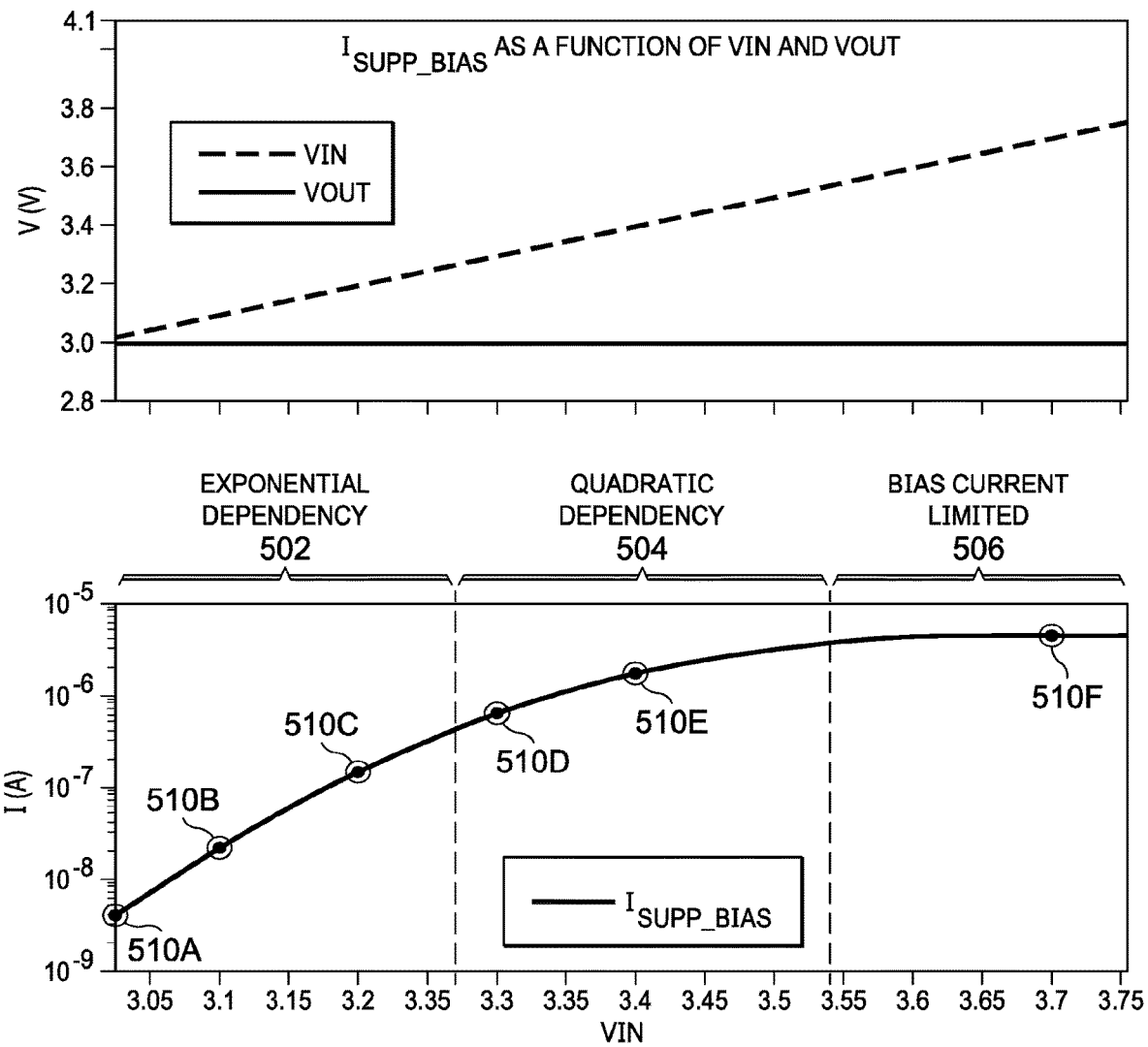
FIG. 5 is a graph showing supplemental bias current as a function of input voltage and output voltage of a buck converter in accordance with examples of the disclosure.

FIG. 5 is a graph 500 showing supplemental bias current (e.g., $I_{SUPP\_BIAS}$) as a function of input voltage and output voltage of a buck converter in accordance with examples of the disclosure. As shown in graph 500, the voltage differential between VIN and VOUT gradually increases, which changes the current dependency from an exponential dependency in a first VIN-VOUT differential range 502 to a quadratic dependency in a second VIN-VOUT differential range 504, and a bias current limited dependency in a third VIN-VOUT differential range 506. Relating $I_{SUPP\_BIAS}$ is FIG. 5, to the dynamic biasing circuit 400 in FIG. 4, the $I_{SUPP\_BIAS}$ is clamped to a maximum ($I_{SUPP\_BIAS\_MAX}$) of 4.3 uA by MN2 and $R_{MaxBias}$. In other examples, $I_{SUPP\_BIAS}$ may be clamped to other maximum values depending on the characteristics of the main comparator.

In FIG. 5, various points 510A-510F along the $I_{SUPP\_BIAS}$ curve of graph 500 are highlighted as examples. More specifically, the first point 510A is in the first VIN-VOUT differential range 502 and corresponds to $I_{SUPP\_BIAS}$=4 nA, when VIN=3.025V and VOUT=3V. The second point 510B is in the first VIN-VOUT differential range 502 and corresponds to $I_{SUPP\_BIAS}$=22.1 nA, when VIN=3.1V and VOUT=3V. The third point 510C is in the first VIN-VOUT differential range 502 and corresponds to $I_{SUPP\_BIAS}$=152.1 nA, when VIN=3.2V and VOUT=3V. The fourth point 510D is in the second VIN-VOUT differential range 504 and corresponds to $I_{SUPP\_BIAS}$=645 nA, when VIN=3.3V and VOUT=3V. The fifth point 510E is in the second VIN-VOUT differential range 504 and corresponds to $I_{SUPP\_BIAS}$=1.7 uA, when VIN=3.4V and VOUT=3V. The sixth point 510F is in the third VIN-VOUT differential range 506 and corresponds to $I_{SUPP\_BIAS}$=4.3 uA, when VIN=3.7V and VOUT=3V.

Figure 6:
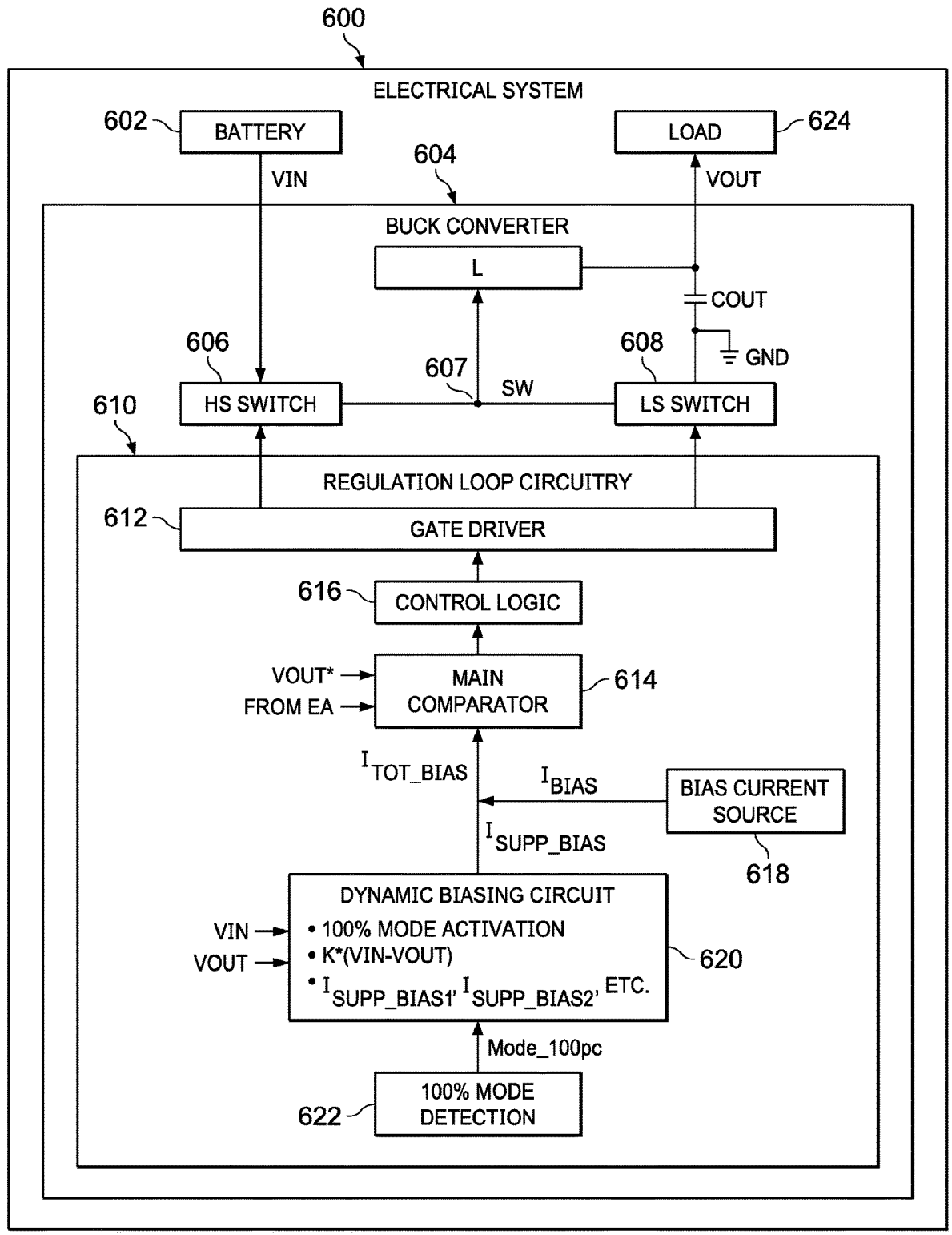
FIG. 6 is a block diagram showing an electrical system in accordance with examples of the disclosure.

FIG. 6 is a block diagram showing an electrical system 600 in accordance with examples of the disclosure. The electrical system 600 in an example of a battery-powered electronic device, such as a smart phone, a wearable, a tablet computer, or other battery-powered electronic device. As shown, the electrical system 600 includes a battery 602 (e.g., different batteries provide different VINs) coupled to a buck converter 604, where the buck converter 604 provides VOUT to a load 624 based on VIN from the battery 602 (or a regulation circuit between the battery 602 and the buck converter 604).

The buck converter 604 includes a high-side (HS) switch 606 (an example of M_HS in FIG. 3A) and a low-side (LS) switch 608 (an example of M_LS in FIG. 3A) coupled between the battery 602 and a ground (GND) node. Between the HS switch 606 and the LS switch 608 is a switch (SW) node 607 coupled to a first end of an inductor, L. The second end of L is coupled to the load 624 and to a first (e.g., top) plate of COUT. Also, the second (e.g., bottom) plate of COUT is coupled to GND. In operation, the voltage level at the SW node 607 alternates between VIN or ground, which causes the current in L to ramp up or down to maintain VOUT even as the load 624 varies. More specifically, the SW node 607 is set to VIN during an on-phase state in which the HS switch 606 is on and the LS switch 608 is off. Alternatively, the SW node 607 is set to GND during an off-phase state in which the HS switch 606 off and the LS switch 608 is on. Another control option for the HS switch 606 and the LS switch 608 is a pause state in which both the HS switch 606 and the LS switch 608 are off.

In the example of FIG. 6, the buck converter 604 includes regulation loop circuitry 610 to manage the on-phase state, the off-phase state, and the pause state of the HS switch 606 off and the LS switch 608. To improve efficiency and transient performance of the buck converter 604 in 100% mode, the regulation loop circuitry 610 includes a dynamic biasing circuit 620 (an example of the dynamic biasing circuit 308 in FIG. 3A, or the dynamic biasing circuit 400 in FIG. 4). As shown, the dynamic biasing circuit 620 is configured to provide $I_{SUPP\_BIAS}$ to a main comparator 614 (an example of Main Comp in FIG. 3A) based on VIN, VOUT, and Mode_100pc, where Mode_100pc is a control signal from a 100% mode detection circuit 622 in FIG. 6. In one example, the 100% mode detection circuit 622 asserts Mode_100pc when VIN approaches VOUT to within a target threshold. One way to detect when VIN approaches VOUT is by using a time-based detection circuit (e.g., use a time reference and a time comparator to monitor when a high-side switch on-time (TON) is greater than a certain time threshold). Another option for detecting when VIN approaches VOUT involves a VIN-VOUT voltage comparator (to identify when VIN-VOUT is greater than or less than a voltage threshold). The main comparator 614 also receives $I_{BIAS}$ from a bias current source 618 (an example of the bias current source 316 in FIG. 3A) so that $I_{TOT\_BIAS}$ received by the main comparator 614 in 100% mode is $I_{TOT\_BIAS}=I_{BIAS}+I_{SUPP\_BIAS}$, where $I_{SUPP\_BIAS}$ varies depending on VIN and VOUT. When Mode_100pc indicates that the buck converter 604 is not in 100% mode, the dynamic biasing circuit 308 is disabled such that $I_{TOT\_BIAS}=I_{BIAS}$. Also, the value of $I_{BIAS}$ changes (e.g., between a nanoampere range and a microampere range) depending on the state of the buck converter 604. For example, in an active mode (when the buck converter is switching to bring VOUT on target), $I_{BIAS}$ may be in a microampere range. As another example, in a pause state (VOUT>VREF and no switching activity), $I_{BIAS}$ may be in a nanoampere range.

In FIG. 6, the inputs into the main comparator 614 include VOUT* (e.g., from a direct control and compensation block as in FIG. 3A) and an EA output (see FIG. 3A). The output of the main comparator 614 is provided to control logic 616. The output of the control logic 616 is provided to a gate driver 612, which operates the HS switch 606 and the LS switch 608 using the on-phase state, the off-phase state, and the pause state described herein.

When the dynamic biasing circuit 620 is enabled by Mode_100pc, $I_{TOT\_BIAS}=I_{BIAS}+I_{SUPP\_BIAS}$. In some examples, $I_{SUPP\_BIAS}$ is estimated as K*(VIN−VOUT), where K is a constant or function. Thus, $I_{SUPP\_BIAS}$ will vary as VIN-VOUT varies as described herein. As $I_{SUPP\_BIAS}$ increases, $I_{TOT\_BIAS}$ input to the main comparator 614 increases, which decreases the propagation delay of the main comparator and thus VOUT overshoot is reduced as described herein.

Figure 7A:
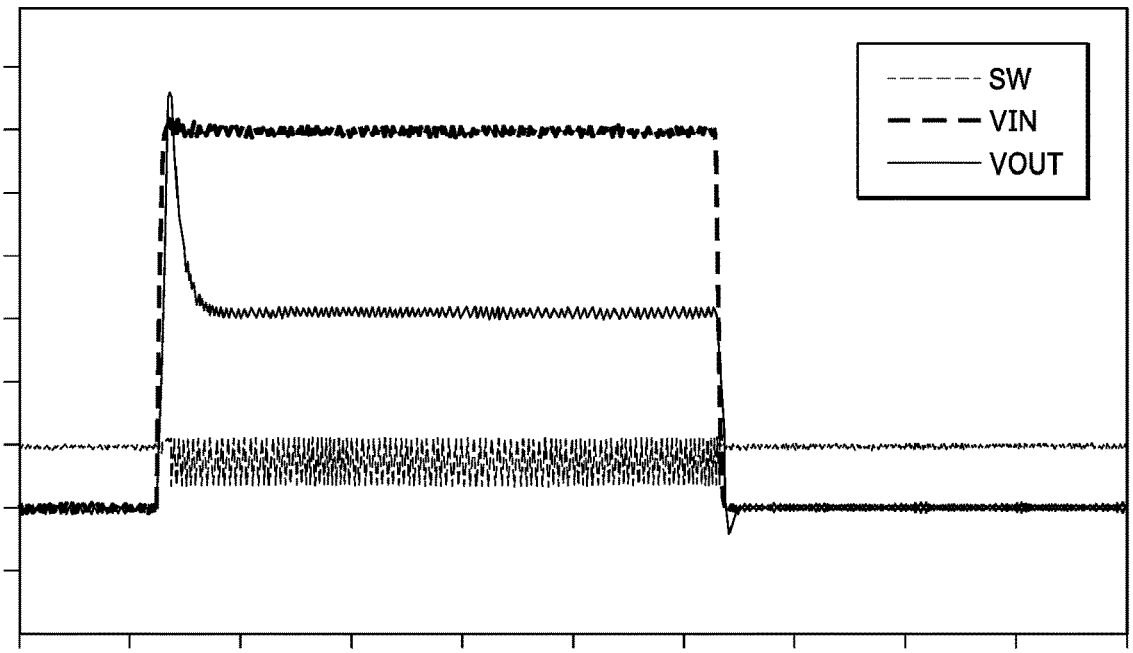
FIGS. 7A and 7B are graphs illustrating 100% mode waveforms to compare buck converter performance with and without the proposed dynamic biasing circuit.
Figure 7B:
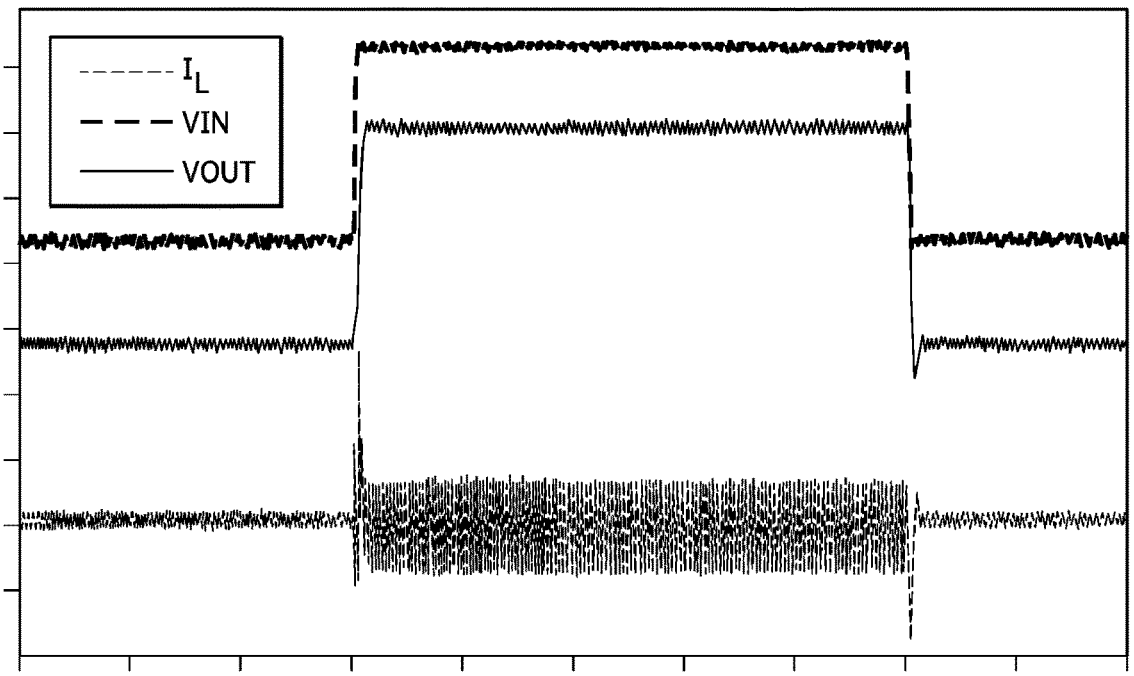

FIGS. 7A and 7B are graphs illustrating 100% mode waveforms to compare buck converter performance with and without the proposed dynamic biasing circuit. In graph 700 of FIG. 7A, a VIN step scenario in 100% mode without a dynamic biasing circuit (e.g., the dynamic biasing circuit 620 in FIG. 6) is represented, where VIN transitions from 3V to 3.6V to 3V in 10 us. Also, no load is assumed. As represented in graph 700, the VIN transition from 3V to 3.6V results in an undesirable VOUT overshoot of 350 mV.

In graph 710 of FIG. 7B, a VIN step scenario in 100% mode with a dynamic biasing circuit (e.g., the dynamic biasing circuit 620 in FIG. 6) is represented, where VIN transitions from 3V to 3.6V to 3V in 1 us. Also, no load is assumed. As represented in graph 710, the VIN transition from 3V to 3.6V does not cause VOUT overshoot.

Figure 8A:
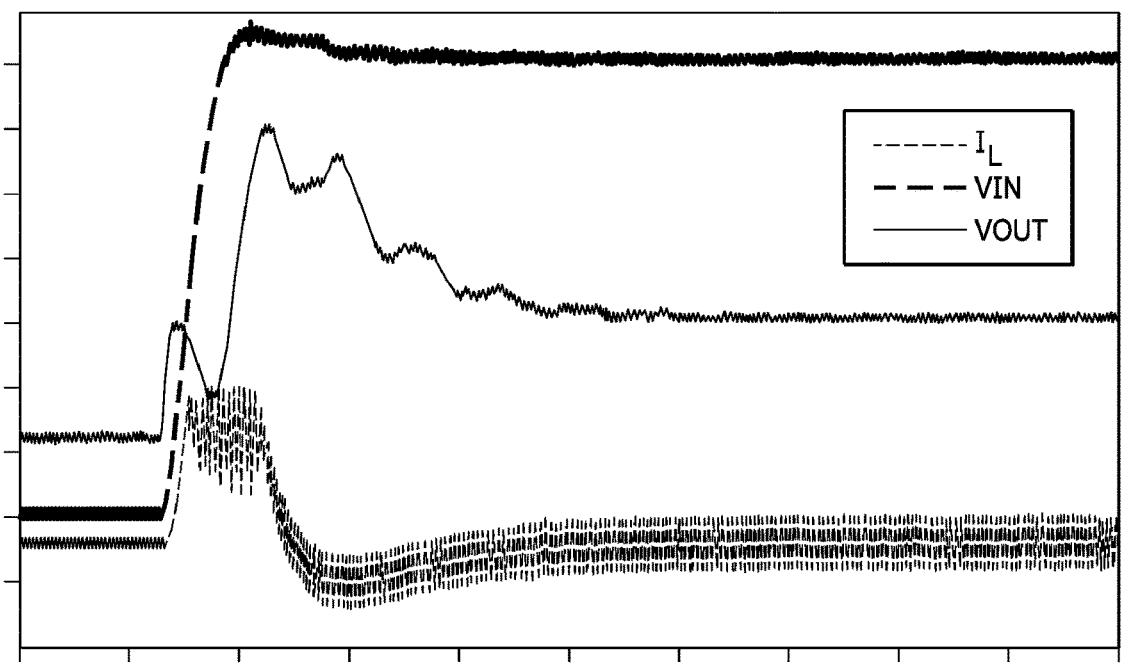
FIGS. 8A and 8B are additional graphs illustrating 100% mode waveforms to compare buck converter performance with and without the proposed dynamic biasing circuit.
Figure 8B:
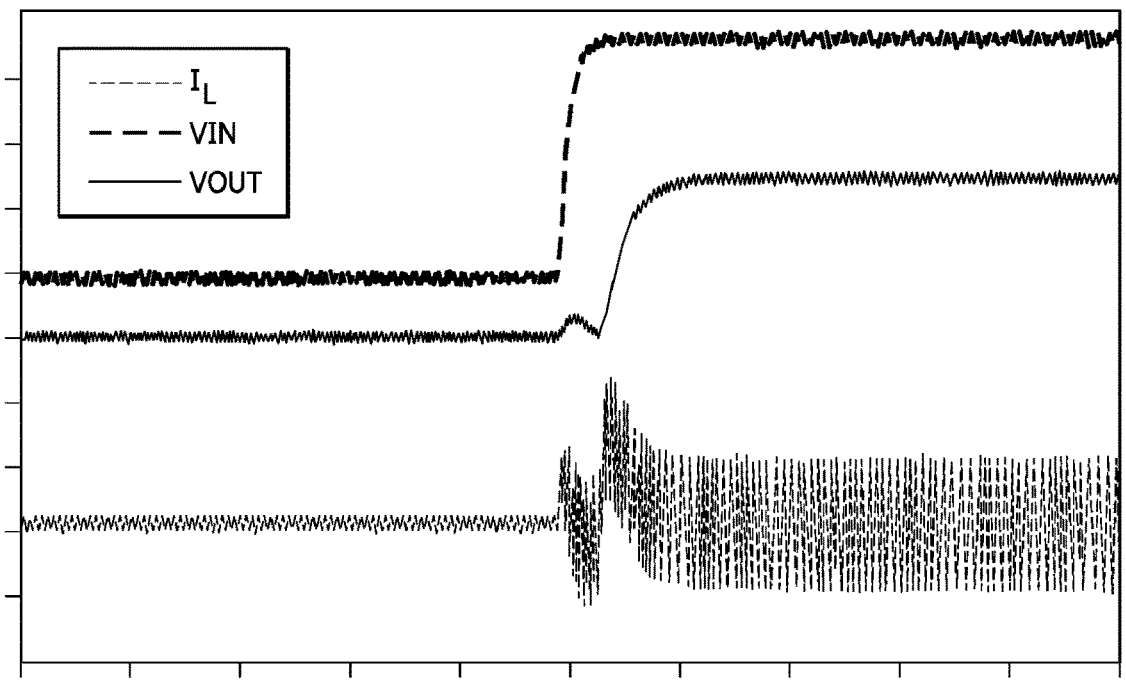

FIGS. 8A and 8B are additional graphs illustrating 100% mode waveforms to compare buck converter performance with and without the proposed dynamic biasing circuit. In graph 800 of FIG. 8A, a VIN step scenario in 100% mode without a dynamic biasing circuit (e.g., the dynamic biasing circuit 620 in FIG. 6) is represented, where VIN transitions from 2.85V to 6.5V in 5 us. Also, no load is assumed. As represented in graph 800, the VIN transition from 2.85V to 6.5V results in an undesirable VOUT overshoot of 600 mV.

In graph 810 of FIG. 8B, a VIN step scenario in 100% mode with a dynamic biasing circuit (e.g., the dynamic biasing circuit 620 in FIG. 6) is represented, where VIN transitions from 2.85V to 6.5V in 5 us. Also, no load is assumed. As represented in graph 810, the VIN transition from 2.85V to 6.5V does not cause VOUT overshoot.

FIG. 9 is a graph 900 illustrating 100% mode efficiency as a function of load current with and without the proposed dynamic biasing circuit ("DBC" in FIG. 9). In graph 900, curve 902 represents efficiency in 100% mode as a function of load current without a dynamic biasing circuit (e.g., the dynamic biasing circuit 620 in FIG. 6). Also, curve 904 represents efficiency in 100% mode as a function of load current with a dynamic biasing circuit (e.g., the dynamic biasing circuit 620 in FIG. 6). As shown, the dynamic biasing circuit improves efficiency in 100% mode for many load current values. For example, without a dynamic biasing circuit, a load current of 1 uA results in Iq=570 nA, and an efficiency of 64% in 100% mode. With a dynamic biasing circuit, a load current of 1 uA results in Iq=120 nA, and an efficiency of 89% in 100% mode.

The proposed dynamic biasing circuit enables a main comparator's operating point to be adjusted depending on the difference between VIN and VOUT. With the dynamic biasing circuit, a main comparator can be run with very low bias current (e.g., $I_{BIAS}$=14 nA in 100% mode). Also, in 100% mode, the dynamic biasing circuit increases $I_{SUPP\_BIAS}$ as needed to achieve fast response (e.g., in response to high load or fast line transient). As described herein, the dynamic biasing circuit provides a maximum $I_{SUPP\_BIAS}$ in a relatively simple manner, which limits the maximum bias current to the main comparator. Without the proposed dynamic biasing circuit, the main comparator runs either: 1) with full (fixed) bias current in 100% mode; or 2) with low bias current and degraded performance (e.g., higher propagation delay), which can lead to significant overshoot at VOUT. With the proposed dynamic biasing circuit, the total bias current in 100% mode can be greatly reduced while achieving high efficiency (e.g., 89% at 1 uA load). As needed, the supplemental bias current from the dynamic biasing circuit is automatically increased at higher loads (increased bias current has no impact on efficiency). Also, the supplemental bias current from the dynamic biasing circuit is automatically increased at rising line transients. In this manner, the tradeoff between a bias current and propagation delay is managed efficiently, resulting in better system performance with lower total Iq for all modes/conditions of the main comparator.

The proposed dynamic biasing circuit provides the advantages of: 1) fast reaction on a line transient as the dynamic bias circuit increases the bias current of the main comparator in 100% mode; 2) faster reaction at a high load drop as the main comparator is running with a higher bias current due to the difference between VIN and VOUT in 100% mode; and 3) at steady-state light load conditions, the Iq is in the nanoampere-region increasing the efficiency up to 89% at 1 uA load current. Also, at light loads in 100% mode, the dynamic bias circuit only adds a small current (e.g., $I_{SUPP\_BIAS\_MIN}$=2 nA) to the bias current of the main comparator.

In some examples, an electrical system (e.g., the electrical system 600 in FIG. 6) includes a buck converter (e.g., the buck converter 604) and a battery (e.g., the battery 602) coupled to an input of the buck converter. The electrical system also includes a load (e.g., the load 624) coupled to an output of the buck converter. The buck converter includes a high-side switch (e.g., the HS switch 606) and a low-side switch (e.g., the LS switch 608). The buck converter also includes regulation loop circuitry (e.g., the regulation loop circuitry 610) coupled to the high-side switch and the low-side switch. The regulation loop circuitry includes a main comparator (e.g., the main comparator 614) and a bias current source (e.g., the bias current source 316 in FIG. 3A, or the bias current source 618 in FIG. 6) coupled to the main comparator and configured to provide a bias current (e.g., $I_{BIAS}$) to the main comparator. The regulation loop circuit also includes a dynamic biasing circuit (e.g., the dynamic biasing circuit 620) coupled to the main comparator and configured to add a supplemental bias current ($I_{SUPP\_BIAS}$) to the bias current in 100% mode of the buck converter, wherein the supplemental bias current varies depending on VIN and VOUT of the buck converter.

In some examples, the electrical system also includes a 100% mode detection circuit (e.g., the 100% mode detection circuit 622) coupled to the dynamic biasing circuit, wherein the dynamic biasing circuit is enabled in response to a control signal (e.g., Mode_100pc) from the 100% mode detection circuit. In some examples, the dynamic biasing circuit is configured to provide a minimum supplemental bias current as the supplemental bias current when VIN is equal to VOUT, wherein the minimum supplemental bias current is greater than zero (e.g., $I_{SUPP\_BIAS\_MIN}$=2 nA). In some examples, the dynamic biasing circuit is configured to increase the supplemental bias current as a difference between VIN and VOUT increases. In some examples, the dynamic biasing circuit is configured to clamp the supplemental bias current to a maximum supplemental bias current ($I_{SUPP\_BIAS\_MAX}$) if the difference between VIN and VOUT is greater than a threshold amount.

In some examples, the main comparator is configured to receive a total bias current (e.g., $I_{TOT\_BIAS}$) in 100% mode based on the supplemental bias current (e.g., $I_{SUPP\_BIAS}$) and the bias current (e.g., $I_{BIAS}$), wherein the supplemental bias current causes the total bias current to increase in response to VIN increasing, and wherein the total bias current does not fall below the bias current in response to falling VIN. In some examples, the electrical system is a portable electronic device, and the buck converter has an Iq below 1 uA at light load.

In some examples, an electronic device (e.g., an integrated circuit, die, chip, multi-die module, or other circuit arrangement) includes a buck converter circuit (e.g., the buck converter 604) having a gate driver (e.g., the gate driver 612) and control logic (e.g., the control logic 616) coupled to an input of the gate driver. The buck converter circuit also includes a main comparator (e.g., the main comparator 614) coupled to an input of the control logic. The buck converter circuit also includes a bias current source (e.g., the bias current source 316 in FIG. 3A, or the bias current source 618 in FIG. 6) coupled to the main comparator and configured to provide a bias current (e.g., $I_{BIAS}$) to the main comparator. The buck converter circuit also includes a dynamic biasing circuit (e.g., the dynamic biasing circuit 620) coupled to the main comparator. The dynamic biasing circuit includes a current mirror (e.g., MP1 and MP2 in FIG. 4). Also, the dynamic biasing circuit is configured to add a supplemental bias current (e.g., $I_{SUPP\_BIAS}$ in FIGS. 3A and 4) to the bias current based on K*(VIN−VOUT), where VIN is the input voltage of the buck converter circuit and VOUT is the output voltage of the buck converter.

In some examples, the buck converter circuit further comprises a 100% mode detection circuit (e.g., the 100% mode detection circuit 622) coupled to the dynamic biasing circuit, wherein the dynamic biasing circuit is enabled in response to a control signal (e.g., Mode_100pc) from the 100% mode detection circuit. In some examples, the dynamic biasing circuit is configured to provide a minimum supplemental bias current as the supplemental bias current when VIN is equal to VOUT, and wherein the minimum supplemental bias current is greater than zero (e.g., $I_{SUPP\_BIAS\_MIN}$=2 nA). In some examples, K is a function with that results in the supplemental bias current having exponential dependency values, quadratic dependency values, and bias current limited values as VIN increases (see e.g., FIG. 5). In some examples, the dynamic biasing circuit is configured to clamp the supplemental bias current to a maximum supplemental bias current ($I_{SUPP\_BIAS\_MAX}$) if the difference between VIN and VOUT is greater than a threshold amount. In some examples, the main comparator is configured to receive a total bias current (e.g., $I_{TOT\_BIAS}$) in 100% mode based on the supplemental bias current (e.g., $I_{SUPP\_BIAS}$) and the bias current (e.g., $I_{BIAS}$), wherein the supplemental bias current causes the total bias current to increase in response to VIN increasing, and wherein the total bias current does not fall below the bias current in response to falling VIN.

In some examples, a circuit (e.g., the buck converter 604 in FIG. 6) includes a first current path, a second current path, and a third current path (see e.g., the current paths of the dynamic biasing circuit 400 in FIG. 4). The circuit also includes a first current mirror (e.g., MP1 and MP2 in FIG. 4) between the first current path and the second current path, wherein the first current path includes a supplemental bias current source (e.g., the supplemental bias current source 308 in FIG. 3A, or the supplemental bias current source 402 in FIG. 4) and a first switch (e.g., MN1 in FIG. 4) controlled by an enable signal (e.g., Mode_100pc in FIG. 4). The circuit also includes a second current mirror (e.g., MN3 and MN4 in FIG. 4) between the second current path and the third current path, wherein the second current path includes a second switch (e.g., MN2 in FIG. 4) controlled by a bias limit control signal (e.g., V_limit_bias in FIG. 4), and wherein the third current path outputs a supplemental bias current (e.g., $I_{SUPP\_BIAS}$ in FIG. 4).

In some examples, the control terminal of the first switch is coupled to and receives the enable signal (e.g., Mode_100pc in FIG. 4) from a 100% mode detection circuit (e.g., the 100% mode detection circuit 622 in FIG. 6). In some examples, the second current path includes a third switch (e.g., MP3 in FIG. 4), wherein a control terminal of the third switch is coupled to and receives another control signal (e.g., Mode_100pc_z) of the 100% mode detection circuit, wherein the other control signal is an inverted version of the enable signal. In some examples, the bias limit control signal (e.g., V_limit_bias in FIG. 4) limits the supplemental bias current (e.g., $I_{SUPP\_BIAS}$ in FIG. 4) when VIN is greater than VOUT by at least a threshold amount. In some examples, the second current path further comprises a resistor (e.g., $R_{MaxBias}$ in FIG. 4) configured to limit the supplemental bias current.

In some examples, the circuit also includes: 1) a main comparator (e.g., the main comparator 306 in FIG. 3A) coupled to the third current path; 2) a bias current source (e.g., the bias current source 316 in FIG. 3A) coupled to third current path and the main comparator; 3) a gate driver (e.g., the date driver 312 in FIG. 3A); and control logic (e.g., the control logic 310 in FIG. 3A) coupled to an input of the gate driver, wherein an output of the main comparator is coupled to an input of the control logic. In some examples, the main comparator is configured to receive a total bias current (e.g., $I_{TOT\_BIAS}$) in 100% mode based on the supplemental bias current (e.g., $I_{SUPP\_BIAS}$) and the bias current (e.g., $I_{BIAS}$), wherein the supplemental bias current causes the total bias current to increase in response to VIN increasing, and wherein the total bias current does not fall below the bias current in response to falling VIN.

Certain terms have been used throughout this description and claims to refer to particular system components. As one skilled in the art will appreciate, different parties may refer to a component by different names. This document does not intend to distinguish between components that differ only in name but not in their respective functions or structures. In this disclosure and claims, the terms "including" and "comprising" are used in an open-ended fashion, and thus should be interpreted to mean "including, but not limited to . . . ."

In this description, the term "couple" or "couples" means either an indirect or direct wired or wireless connection. Thus, if a first device couples to a second device, that connection may be through a direct connection or through an indirect connection via other devices and connections. The recitation "based on" means "based at least in part on." Therefore, if X is based on Y, X may be a function of Y and any number of other factors.

Modifications are possible in the described embodiments, and other embodiments are possible, within the scope of the claims.

What is claimed is:

1. A voltage converter comprising:
a converter input and a converter output, wherein the converter input has a voltage VIN, and the converter output has a voltage VOUT;
a high-side switch;
a low-side switch;
a comparator having first and second comparator inputs, a bias input, and a comparator output, wherein the first comparator input is coupled to a feedback voltage terminal providing a signal proportional to VOUT, and the second comparator input is coupled to a reference voltage terminal;
a bias current source coupled to the bias input and configured to provide a bias current;
a dynamic biasing circuit coupled to the bias input and configured to provide a supplemental bias current responsive to the voltage converter operating in a 100% mode, wherein the supplemental bias current is proportional to a difference between VIN and VOUT;
control logic having a logic input and a logic output, wherein the logic input is coupled to the comparator output; and
a gate driver having a driver input and first and second driver outputs, wherein the driver input is coupled to the logic output, the first driver output is coupled to the high-side switch, and the second driver output is coupled to the low-side switch.

2. The voltage converter of claim 1, wherein the dynamic biasing circuit is configured to increase the supplemental bias current as the difference between VIN and VOUT increases.

3. The voltage converter of claim 2, wherein the dynamic biasing circuit is configured to clamp the supplemental bias current to a maximum supplemental bias current responsive to the difference between VIN and VOUT being greater than a threshold amount.

4. The voltage converter of claim 1, further comprising a 100% mode detection circuit coupled to the dynamic biasing circuit, wherein the dynamic biasing circuit is enabled in response to a control signal provided by the 100% mode detection circuit.

5. The voltage converter of claim 1, wherein the dynamic biasing circuit is configured to provide a minimum supplemental bias current as the supplemental bias current responsive to VIN being equal to VOUT, and the minimum supplemental bias current is greater than zero.

6. The voltage converter of claim 1, wherein a total bias current is a sum of the supplemental bias current and the bias current, the supplemental bias current causes the total bias current to increase in response to VIN increasing when operating in 100% mode, and the total bias current does not fall below the bias current in response to VIN decreasing.

7. The voltage converter of claim 1, wherein the voltage converter has a quiescent current (Iq) below 1 uA at light load.

8. An electronic device, comprising:
a voltage converter circuit having:
a converter input and a converter output, wherein the converter input has a voltage VIN, and the converter output has a voltage VOUT;
a high-side switch;
a low-side switch; and
a comparator having first and second comparator inputs, a bias input, and a comparator output, wherein first comparator input is coupled to a feedback voltage terminal providing a signal proportional to VOUT, and the second comparator input is coupled to a reference voltage terminal;
a bias current source coupled to the bias input and configured to provide a bias current; and
a dynamic biasing circuit coupled to the bias input and including a current mirror, wherein the dynamic biasing circuit is configured to provide a supplemental bias current, the supplemental bias current equal to K*(VIN−VOUT);
a battery coupled to the converter input; and
a load coupled to the converter output.

9. The electronic device of claim 8, wherein the voltage converter circuit further includes a 100% mode detection circuit coupled to the dynamic biasing circuit, and the dynamic biasing circuit is enabled responsive to a control signal provided by the 100% mode detection circuit.

10. The electronic device of claim 9, wherein the dynamic biasing circuit includes a first transistor coupled between the current mirror and an internal current source, and having a first control terminal, wherein the first control terminal is coupled to the 100% mode detection circuit and receives the control signal.

11. The electronic device of claim 10, wherein the dynamic biasing circuit further includes a second switch having a second control terminal, wherein the second switch is controlled by a bias limit control signal.

12. The electronic device of claim 11, wherein the bias limit control signal limits the supplemental bias current responsive to VIN being greater than VOUT by at least a threshold amount.

13. The electronic device of claim 8, wherein K is a function that results in the supplemental bias current having exponential dependency values, quadratic dependency values, and bias current limited values responsive to an increase in VIN.

14. The electronic device of claim 13, wherein the comparator receives a total bias current at the bias input when operating in 100% mode, the total bias current being a sum of the supplemental bias current and the bias current.

15. The electronic device of claim 8, wherein the dynamic biasing circuit is configured to clamp the supplemental bias current to a maximum supplemental bias current responsive to a difference between VIN and VOUT being greater than a threshold amount.

16. The electronic device of claim 8, wherein the dynamic biasing circuit is configured to provide a minimum supplemental bias current as the supplemental bias current responsive to VIN being equal to VOUT, and the minimum supplemental bias current is greater than zero.

* * * * *